(12) United States Patent
Lowe

(10) Patent No.: US 6,545,729 B1
(45) Date of Patent: Apr. 8, 2003

(54) FOAM CABINETRY FOR ELECTRONIC DEVICES

(75) Inventor: Jerry Bailey Lowe, San Clemente, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 09/643,892

(22) Filed: Aug. 18, 2000

(51) Int. Cl.[7] ................................................. H04N 5/64
(52) U.S. Cl. ...................... 348/836; 312/72; 428/304.4; 358/254
(58) Field of Search ............................ 428/304.4, 318.4, 428/319.3, 319.7, 71; 358/254; 348/836, 837, 838, 839, 840, 841, 842, 843; 312/7.2, 257.1, 263, 265.5, 265.6, 265.1, 264

(56) References Cited

U.S. PATENT DOCUMENTS

| | | | |
|---|---|---|---|
| 3,772,110 A | | 11/1973 | Brown |
| 4,121,008 A | * | 10/1978 | Seddon ................ 428/304.4 X |
| 4,177,484 A | * | 12/1979 | Boje ......................... 358/254 |
| 4,478,902 A | | 10/1984 | Tsuzuku et al. |
| 5,111,626 A | | 5/1992 | Fortune |
| 5,261,734 A | | 11/1993 | Speraw |
| 5,679,432 A | * | 10/1997 | Holmquest et al. .. 428/318.4 X |
| 5,695,870 A | * | 12/1997 | Kelch et al. ............. 428/318.4 |
| 5,786,933 A | * | 7/1998 | Iwai et al. ............... 348/836 X |
| 6,027,798 A | * | 2/2000 | Childress ................. 428/319.3 |
| 6,093,481 A | * | 7/2000 | Lynn et al. ........... 428/319.7 X |
| 6,095,623 A | * | 8/2000 | Goto et al. .................... 312/7.2 |
| 6,152,552 A | * | 11/2000 | Snoke et al. ............. 312/257.1 |

FOREIGN PATENT DOCUMENTS

EP          0 211 348          3/1992
JP          10-200833          7/1998

OTHER PUBLICATIONS

Kerouac, et al., "Evaluation of Rib Designs in IR Materials Using the Solid, Structural Foam, and Gas–Assist Molding Processes," *Society of Plastics Engineers*, vol. 1 1996, pp. 454–459.
J. Czerski, "Thermal Structural Foams," *Structural Plastic Foams Materials, Processing Markets and Applications, Plastics Institute Structural Plastics Foam Conference Bradford*, Feb. 27/28, 1974, pp. 1–13.
Stuart Wood, "Getting Set for Fire–Safe TV Cabinets," *Modern Plastics*, vol. 51, No. 9 Sep. 1974, pp. 74–77.
Dg Chabot, "Furniture Parts: What Does Structural Foam Offer," *Modern Plastics*, vol. 48, No. 4 Apr. 1971, pp. 72–73.
S. Suzuki, "Desing and Applications of Combined Damping Materials with Polyurethane Foam," *International Polymer Science and Technology*, vol. 15, No. 6 1988, pp. T/39–T/44.
Kerouac, et al., "Evaluation of Rib Design in IR Materials Using the Solid, Structural Foam, and Gas–Assist Molding Processes," *Society of Plastics Engineers*, vol. 1 1996, pp. 454–459.

(List continued on next page.)

*Primary Examiner*—John G. Weiss
*Assistant Examiner*—Michael Fisher

(57) ABSTRACT

PTV cabinetry comprising molded plastic foam parts formed from expanded polystyrene or phenolic foam. The foam parts are preferably functionally designed to replace the equivalent parts presently being made by wood fabrication or other molded plastic techniques. In a preferred embodiment, a PTV cabinet may be assembled from thee matching molded foam parts. The foam parts may be uniquely located with respect to one another via locating features molded into the foam parts. Once assembled, an external cabinet or cosmetic fascia part may be placed over the foam parts.

34 Claims, 3 Drawing Sheets

OTHER PUBLICATIONS

J. Czerski, "Thermal Structural Foams," *Structural Plastic Foams Materials, Processing Markets and Applications, Plastics Institute Structural Plastics Foam Conference Bradford*, Feb. 27/28 1974, pp. 1–13.

Dg Chabot, "Furniture Parts: What Does Structural Foam Offer," *Modern Plastics,* vol. 48, No. 4 Apr. 1971, pp. 72–73.

N/A, "High–Flow, FR–HIPS for Structural Foam," *Plastics Technology,* vol. 44, Part 1 Jan. 1998, pp. 55.

J. A. Grande, "Gas–Assist Builds New Momentum," *Modern Plastics,* Jun. 1996, pp. 48, 50, 53.

N/A, "FR Polystyrene Aimed at Thermoforming," *Modern Plastics,* vol. 62, No. 7 Jul. 1985, p. 97.

N/A, "Resin Thwarts Flames," *Plastics Engineering,* vol. 54, Part 4 Apr. 1998, p. 44.

D. Smock, "World's Oldest Molder Targets Electronic Enclosures," *Plastic World,* vol. 54, No. 3 Mar. 1996, p. 66/8.

R. Grace, "Award Winners Share Designing Spotlight," *Plastic News,* vol. 8, Part 7 Apr. 15, 1996, pp. 25–29.

L.M. Sherman, "Blowing Agents for Thermoplastics. Endothermics on the Rise," *Plastics Technology,* vol. 42, Part 3, Apr., 1996, pp. 42–45.

L. Leonard, "Structural Plastics Winner Came from Near and Far," *Plastics Design Forum,* vol. 19, No. 6, Jul./Aug., 1994, pp. 26–29.

E. Galli, "Winning Designs in Stuctural Plastics," *Injection Molding for Plastics Injection Molding Professionals,* vol. 2, No. 6, Jul. 1994, pp34–35.

E. Galli, "Structural Plastics: New designs for Big Parts," *Plastics design Forum,* vol. 16, No. 5, Jul., 1991, pp. 53–57.

N/A, "Foam Injectioning," *Plastics Industry News (Japan),* vol. 35, No. 5, May 1989, pp. 68–69.

N/A, "Structural Foam Moulders Expand," *British Plastics and Rubber,* Jul. 1988, p. 11.

B.A. Loye, "Coatings for Business and Electronic Equipment," *2 day Symposium on Coatings for Plastics,* May 12.13, 1986, pp. 51–59.

N/A, "Lightweight Technical Foam Products," *Plast. Mod. Elast.,* vol. 35, No. 2, Mar. 1983, pp. 55–57.

N/A, "Toughened Frame Resistant PS Mix," *Plastics Rubber Weekly,* No. 985, Apr. 30, 1983, p. 16.

N/A, "Two–Component Foam Injection Matures," *British Plastics and Rubber,* Feb. 1983, p. 7.

N/A, "Why So Many New V–O PS Grades," *Modern Plastics International,* vol. 12, No. 9, Sep. 1882, pp. 50–51.

R.D. Bieniarz, "Fire Experiments on Structural Foam Plastic Equipment Enclosures," *The Society of Plastic Industry, Inc.,* Feb. 1981.

H. Eckardt, "Energy and Material Cost savings with Structural Foam Moulding Techniques," *Society of Plastics Engineers,* $38^{th}$ Annual Technical Conference, May 5–8, 1980, pp. 175–177.

W. Gemmell, "Thermoplastics Structural Foams; A European Experience," *Eur. J. Cell. Plast.,* vol. 1, No. 3, Jul. 1978, pp. 141–146.

\* cited by examiner

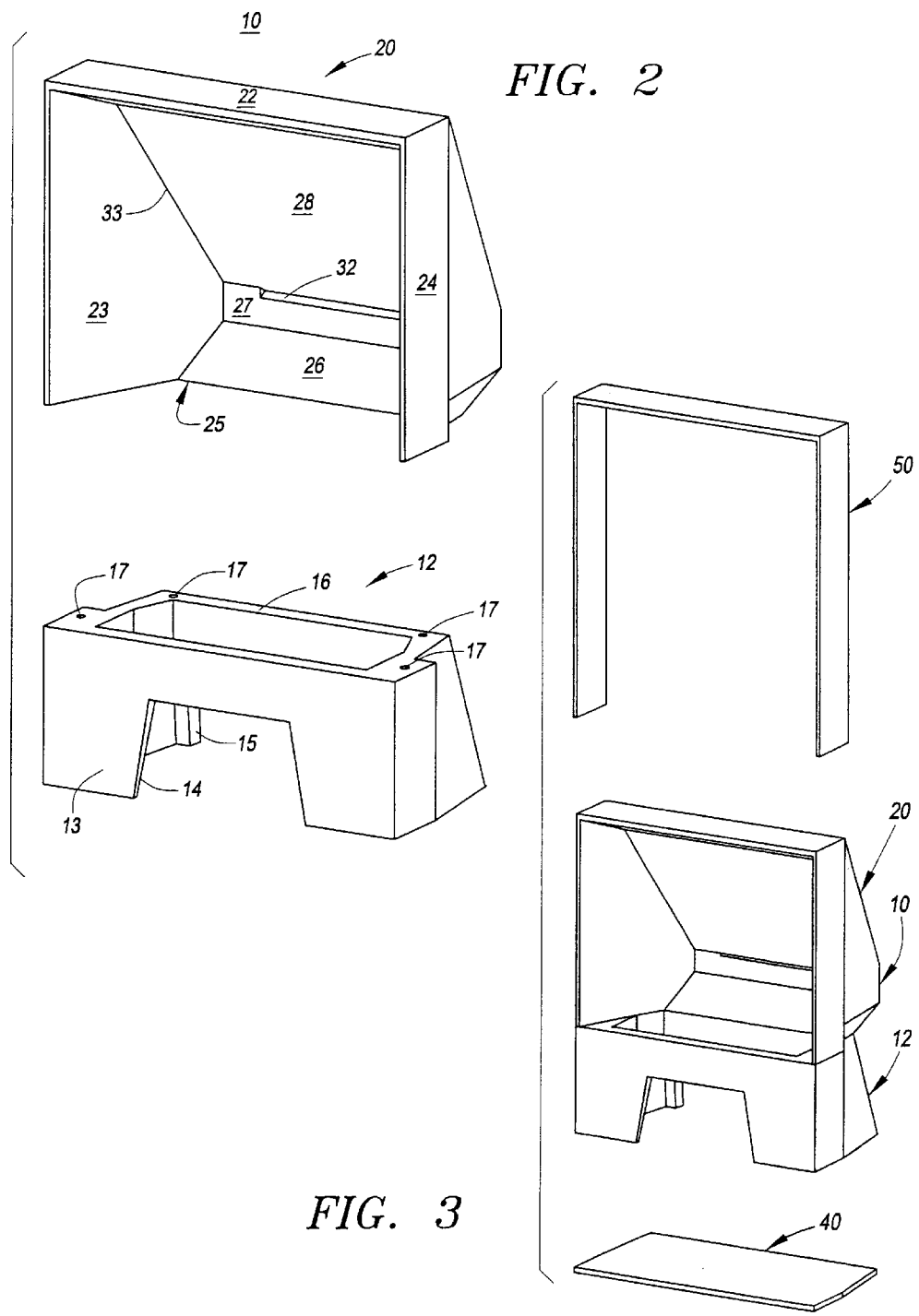

FOAM CABINETRY FOR ELECTRONIC DEVICES

FIELD OF THE INVENTION

The present invention relates generally to cabinetry for electronic devices such as projection televisions (PTVs) and, more particularly, to expanded foam cabinetry that facilitates lower manufacturing costs, lighter product weight, lower transportation costs, and simpler product assembly, while maintaining structural integrity.

BACKGROUND OF THE INVENTION

PTVs or "big screen" TVs are a popular alternative to picture tube TVs because they provide comparably larger viewable screens that cannot be efficiently produced using conventional picture tubes. PTV cabinets are presently designed to hold electrical and optical components as required to decipher and project a television picture on a screen generally on the front of the cabinet. The most common PTV on the market today projects pictures created via appropriate electrical and optical components onto a mirror within a box containing the entire apparatus so that the picture reflected to a screen is as large as possible for the volume occupied by the cabinet enclosing it. PTV screens typically range in size from about 45 to about 73 inches along their diagonal, while the cabinets typically range in size from about 48 inches to over 65 inches in height, from about 38 inches to over 65 inches in width, and from about 22 inches to over 29 inches in depth. The cabinets are assembled in an aesthetically appealing manner as required to hold the electrical components, light generator(s), and lenses, mirror and screen in the relationship required to obtain the desired televised picture.

Most PTVs marketed today include a cabinet constructed from multiple pieces of particleboard cut and glued together. Some cabinets also have plastic components held to the basic cabinet structure with screws or other fasteners. The number of plastic components and particleboard pieces needed to form such cabinets typically range in excess of fifty (50) pieces. As a result, these cabinets tend to be quite complicated and costly to assemble. Because of the size of PTVs, and the particleboard from which the cabinets are typically constructed, PTVs tend to be quite heavy and difficult to maneuver, and, as a result, tend to be costly to transport.

Alternative methods of manufacture are available that may reduce the overall weight of these cabinets and also the number of components necessary to construct such cabinets. For instance, injection molding could be used to form such cabinets out of plastic. However, because of the complexity of the mold needed to accommodate the high operating pressures (typically 300–500 psi) that the mold is subjected to during the injection process, injection molding these cabinets tends to be costly and time consuming. The injection mold for such cabinets is likely to cost in the range of about one million to one and one-half million dollars and likely to take up to twenty (20) weeks or more to design and manufacture. Because of the high costs and long lead times, injection molding is a less than desirable alternative to conventional methods.

Another alternative would be to vacuum form the cabinetry out of plastic. Although attractive from a tooling cost standpoint, vacuum forming has its drawbacks. Vacuum forming tends to result in inconsistent material cross-sections, high material waste and high labor costs.

Thus, it would be desirable to provide cabinetry for electronic devices such as PTVs, and for other storage applications, that is easy to manufacture, that reduces the weight of end products, that reduces manufacturing and transportation costs, and that is resilient and structurally sound for the particular application.

SUMMARY OF THE INVENTION

The present invention is directed to cabinetry for a variety of storage applications and, more particularly to cabinetry for electronic devices such as PTVs that, when compared to conventional cabinetry, tends to be simpler to manufacture, lighter in weight, less costly to manufacture and transport, and easier to handle. Although significantly lighter in weight, the structural integrity of the cabinetry of the present invention tends to be comparable to conventional cabinetry. In a particularly innovative aspect, the cabinetry of the present invention utilizes molded plastic foam formed from expanded polystyrene or phenolic foam that is sandwiched between coatings of an appropriate structural material such as plastic to form the desired cabinet or cabinet component. Preferably, a coating of urethane may be sprayed onto the surface of the foam parts to provide a resilient and cosmetically appealing surface finish to the foam parts. The foam parts are preferably functionally designed to replace the equivalent parts presently being made by wood fabrication or other molded plastic techniques.

In a preferred embodiment, a PTV cabinet of the present invention may be assembled from three matching cabinet components formed from the preferred sandwich structure comprising expanded polystyrene and structural coatings. The foam parts are preferably fastened to a generally flat base formed from wood, particleboard, concrete or some other appropriate material. An external cabinet or cosmetic fascia part formed from injection molded or extruded plastic, or particle board, may be placed over the foam parts and fastened to the base to hold the assembly together.

In another innovative aspect, the foam parts in accordance with the present invention may be uniquely located with respect to one another via locating features molded into the foam parts.

In another innovative aspect, the foam parts in accordance with the present invention include mirror-capturing members adapted to capture the mirror of the PTV upon assembly of the foam parts.

In yet another innovative aspect, a PTV cabinet in accordance with the present invention may be formed as a unitary member from the preferred sandwich structure comprising expanded polystyrene and fastened to a base assembly comprising a base platform and a speaker panel fastened thereto.

Other innovative aspects of the invention include the preceding aspects individually or in combination.

Other aspects and features of the present invention will become apparent from consideration of the following description taken in conjunction with the accompanying drawings.

BRIEF DESCRIPTION OF THE DRAWINGS

FIG. 2 is an isometric exploded assembly view of the PTV cabinet shown in FIG. 1 wherein the mating top halves of the cabinet are shown assembled.

FIG. 3 is an isometric exploded assembly view including of an assembled PTV cabinet, a base, and an external cabinet.

FIG. 4b is a plan view of a base assembly for the PTV shown in FIG. 4a.

DETAILED DESCRIPTION OF PREFERRED EMBODIMENTS

Figure 1:
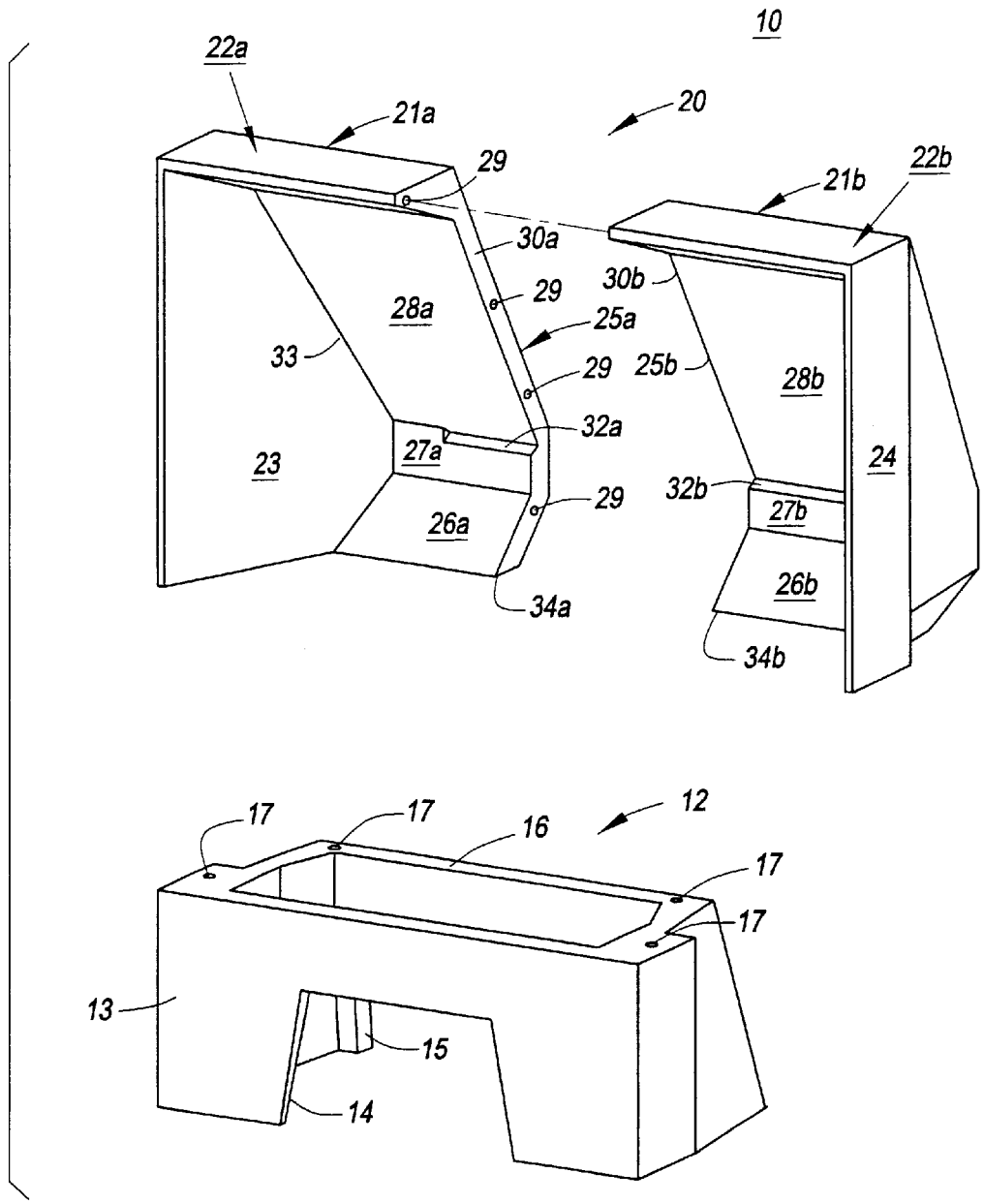
FIG. 1 is an isometric exploded assembly view of a PTV cabinet in accordance with the present invention.

The cabinetry of the present invention tends to facilitate lower manufacturing costs, lighter products that are easier to handle and less costly to transport, and simpler product assembly by reducing the number parts to be assembled. A PTV cabinet in accordance with the present invention preferably replaces most, if not all, of the wooden components found in a conventional cabinet with lightweight molded plastic foam components. The plastic foam components are preferably formed from expanded polystyrene or phenolic that is that is sandwiched between coatings of an appropriate structural material such as plastic. Preferably, a coating of urethane may be sprayed onto the surface of the foam parts to provide a resilient and cosmetically appealing surface finish to the foam parts. The expanded polystyrene foam preferably has a density in a range of about three (3) to six (6) pounds per cubic inch.

Because expanded polystyrene is so light in weight, strength and durability tend not to be qualities that have been associated with it. As a result, expanded polystyrene has tended not to be considered a viable material for the construction of such things as cabinetry for PTVs, where structural strength and durability are essential qualities of the structure. However, the structural integrity of the cabinetry of the present invention, which is formed from a sandwich structure comprising expanded polystyrene foam sandwiched between plastic surface coatings, has been found to be comparable to that of conventional cabinetry.

In forming the cabinetry, a mold of the desired cabinet or cabinet component is preferably cast from aluminum or other appropriate material. Prior to injecting the polystyrene into the mold at relatively low pressures in the range of about five (5) to fifteen (15) psi and preferably about eight (8) psi, the polystyrene is subjected to a process known by those skilled in the art to inject a blowing agent, such as heptane, into the polystyrene beads. The polystyrene is then injected into the mold and heated to expand the blowing agent within the beads, which in turn expands the beads such that the polystyrene material coalesces into a generally homogeneous structure as it is pressed against the walls of the mold. Preferably, the polystyrene material is injected into the mold with live steam. The steam tends to drive most of the blowing agent out of the beads, which tends to make the end product more flame retardant. In a preferred embodiment, the polystyrene beads are expanded about twenty (20) times their original size and optionally within a range of about fifteen (15) to thirty (30) times their originally size. Once released from the mold, the cabinet or cabinet component, e.g., a structural panel, is preferably coated with an appropriate structural material such as plastic. In a preferred embodiment, a urethane material, such as Styrothane™, may be used to provide the cabinet or component with a resilient and cosmetically appealing surface finish.

Referring to FIG. 1, the PTV cabinet 10 in accordance with the present invention is preferably formed in a manner described above from a sandwich structure comprising expanded polystyrene foam sandwiched between plastic coatings. As shown, the PTV cabinet 10 preferably includes a base cabinet 12 for housing an optical unit of the PTV and a top cabinet portion 20 for housing a mirror and hanging a screen of the PTV. As discussed below, the top cabinet 20 is mountable on the base cabinet 12. The top portion 20 may comprise two mirror image mating halves 21a and 21b or a unitary component similar in appearance to the assembled top cabinet 20 shown in FIG. 2. The left and right top halves 21a and 21b, respectively, include integrally formed top panels 22a and 22b, side panels 23 and 24, and rear panels 25a and 25b. The rear panels 25a and 25b include top 28a and 28b, bottom 26a and 26b, and middle 27a and 27b portions. The two halves 21a and 21b also include internal mating surfaces 30a and 30b, which preferably have matching outer contours. Locating features are preferably molded into the two halves 21a and 21b so that the two halves 21a and 21b may be uniquely brought together to make a closed top assembly 20 for the cabinet 10. The locating features may include pins or tongue and groove features molded into the mating halves 21a and 21b. As shown in FIG. 1, a series of locating holes 29 are molded into the left top half 21a extending into the left half 21a from the left internal mating surface 30a. The locating holes 29 are sized and positioned to receive locating pins (not shown) integrally formed with the right top half 21b and extending from the right internal surface 30b of the right top half 21b.

In bringing the two halves 21a and 21b together, the PTV mirror (not shown), which is required to direct the projected image within the cabinet 10 on to a screen (not shown), may be captured between the top cabinet halves 21a and 21b. This advantageously minimizes the steps needed to assemble the PTV. In a preferred embodiment, grooves 33 may be formed in the side panels 23 and 24 adjacent to the rear panels 25a and 25b of the left and right halves 21a and 21b. The grooves 33 are preferably sized and configured to capture a mirror when the top cabinet halves 21a and 21b are brought together. The mirror may also rest on recesses 32a and 32b formed in the top of the middle portions 27a and 27b of the rear panels 25a and 25b.

Once assembled, the top part 20 of the cabinet 10 may appear as one piece as show in FIG. 2. The bottom cabinet 12 preferably includes a box-like body 13 having front 14 and rear 15 cutouts to reduce the weight of the bottom cabinet 12. The front cutout 14 may accommodate audio speakers and a speaker panel (not shown). The bottom cabinet 12 includes an internal top mating surface 16 that preferably matches an internal bottom mating surface 34 of the top cabinet 20. The top cabinet 20 and bottom cabinet 12 preferably include unique locating features such as locating pins or tongue and groove locators molded into their abutting surfaces to uniquely locate one with respect to the other. As shown in FIGS. 1 and 2, pin locating holes 17 are formed in the bottom cabinet 12. The locating holes 17 extend into the bottom cabinet 12 from the top mating surface 16 and are preferably sized and positioned to receive locating pins (not shown) integrally formed with the top cabinet 20 and extending from the bottom mating surface 34 of the top cabinet 20.

With the top and bottom cabinets 20 and 12 assembled together, the bottom or base cabinet 12 is fastened to a general flat base 40, as shown in FIG. 3. The base 40 is preferably formed from wood, particleboard, concrete or some other appropriate material. Where necessary, the weight of the base may be increased to tend to reduce the tip potential of the assembled package.

As shown in FIG. 3, an external cabinet or cosmetic fascia 50, which is generally U-shaped, is preferably placed over the foam portions 20 and 12 of the cabinet structure 10 toward the front of the cabinet 10. The entire assembly 10 is preferably held together by fastening the external cabinet 50 to the base 40. The external cabinet or cosmetic fascia 50 is preferably formed from injection molded or extruded plastic.

The foam parts 12 and 20 of the cabinet 10 are preferably coated with a structural material to form the desired sandwich structure. A urethane material, such as Styrothane™, may be used to provide the cabinet 10 with a resilient and cosmetically appealing surface inside and outside. Alternatively, the exterior of the PTV cabinet 10 may be coated with a material that is less costly due to its flamability rating. With such a surface finish, the cabinet 10 may optionally be assembled without the external cabinet 50 by fastening the top cabinet 20 to the bottom cabinet 12, and then fastening the bottom cabinet 12 to the base 40. In such instances, plastic fastener anchors may be used to properly anchor the fasteners in the foam part.

Figure 4A:
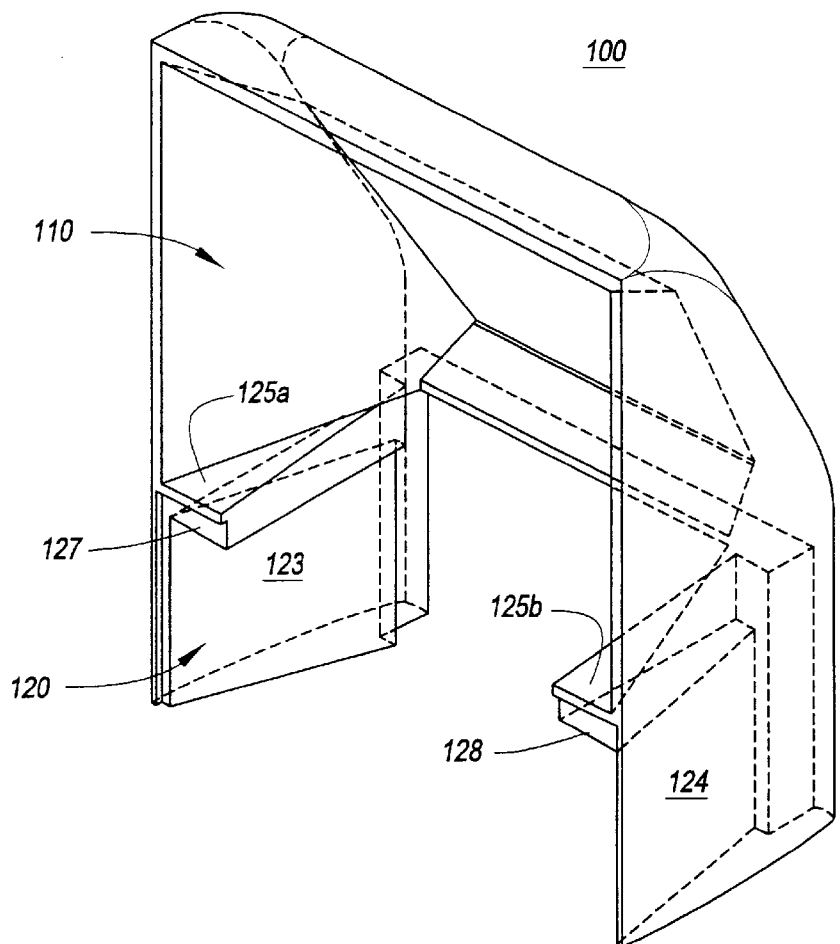
FIG. 4a is an isometric view of an alternative embodiment of a PTV cabinet in accordance with the present invention.
Figure 4B:
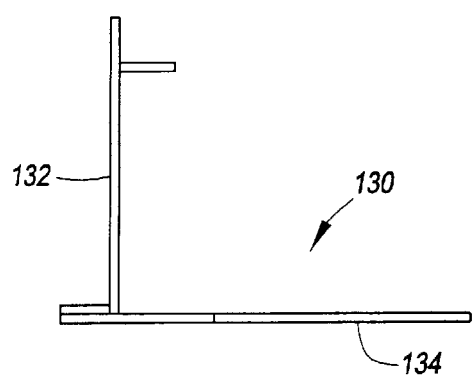

Turning to FIGS. 4a and 4b, an alternative embodiment of the present invention is shown to include a PTV cabinet 100 of unitary design formed in a manner described above from a sandwich structure including expanded polystyrene foam sandwiched between a structural material such as plastic. The unitary cabinet 100 includes an upper enclosure portion 110 for housing a mirror and hanging a screen, and a lower enclosure portion 120 for housing an optical unit. The cabinet 100 is partitioned into the upper and lower enclosures 110 and 120 by partition members 125a and 125b, which extend inwardly from side panels 123 and 124. The bottom of the cabinet 100 is preferably fastened to a base assembly 130 comprising a speaker panel 132 formed from wood, particle board, or some other appropriate material, fastened to a base platform 134 formed from wood, particle board, concrete, or some other appropriate material. Recesses 127 and 128 may be formed in the side panels 123 and 124 and partition members 125a and 125b to accommodate the speaker panel 132. Where necessary, the weight of the base platform 134 may be increased to reduce the tip potential of the assembled package.

For exemplary purposes only, the foregoing discussion of the present invention focused on cabinetry for PTVs. However, one skilled in the art would understand that a cabinet made in accordance with the present invention could be used to house a variety of electronic components or used in a variety of storage applications. Alternatively, sandwich structured panels formed in a manner described above may be used to form a variety of enclosures.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A cabinet for a PTV comprising
   a top cabinet portion for housing a mirror, and
   a bottom cabinet portion coupled to said top cabinet portion, wherein said top and bottom cabinet portions are formed from structural expanded polystyrene foam coated with a cosmetic coating.

2. The cabinet of claim 1 wherein said cosmetic coating is made from plastic.

3. The cabinet of claim 1, wherein the foam has a density in a range from about greater than 3 to 6 pounds per cubic feet.

4. The cabinet of claim 1 wherein said cosmetic coating comprises a first coating of material applied to a first side of said foam and a second coating of material applied to a second side of said foam.

5. The cabinet of claim 4 wherein said first and second coatings of material comprise a urethane material.

6. The cabinet of claim 1 further comprising locating features integrally formed with said top and bottom cabinet portions.

7. The cabinet of claim 1 further comprising a base, said bottom portion being fastened to said base.

8. The cabinet of claim 1 wherein said top cabinet portion comprises
   a first half, and
   a second half coupled to said first top half, said second top half being a mirror image of said first top half.

9. The cabinet of claim 8 wherein said first and second halves are adapted to capture a mirror there between when assembled.

10. The cabinet of claim 9 further comprising opposing grooves formed in side portions of said first and second halves.

11. The cabinet of claim 8 wherein said first and second halves include locating features integrally formed with said first and second halves.

12. The cabinet of claim 11 wherein said locating features are molded into said first and second halves.

13. The cabinet of claim 11 wherein said locating features comprise a plurality of tongue and grooves.

14. The cabinet of claim 11 wherein said locating features comprise a plurality of locating pins.

15. The cabinet of claim 1 further comprising an external cabinet placed over a top portion of said top cabinet portion and side portions of said top and bottom cabinet portions.

16. The cabinet of claim 15 further comprising a base, said external cabinet being fastened to said base.

17. A cabinet for a PTV comprising
   a molded unitary enclosure partitioned into upper and lower portions, said upper portion adapted to house a mirror and said lower portion adapted to house an optical unit, said enclosure being formed from structural expanded polystyrene foam, and
   a base assembly fastened to said enclosure.

18. The cabinet of claim 17, wherein the foam has a density in a range from about greater than 3 to 6 pounds per cubic feet.

19. The cabinet of claim 17, further comprising a fascia extending over a top portion and side portions of the enclosure.

20. The cabinet of claim 17 wherein said foam is coated with a cosmetic layer of plastic.

21. The cabinet of claim 17 further comprising a first coating of a cosmetic material applied to a first side of said foam and a second coating of a cosmetic material applied to a second side of said foam.

22. The cabinet of claim 21 wherein said first and second coatings of cosmetic material comprise a urethane material.

23. A structural panel comprising
   first and second layers comprising a cosmetic material, and
   a third layer formed of low density structural expanded polystyrene foam and interposed between said first and second layers.

24. The cabinet of claim 23, wherein the foam has a density in a range from about greater than 3 to 6 pounds per cubic feet.

25. The structural panel of claim 23 wherein said cosmetic material is plastic.

26. A structural panel comprising first and second layers comprising a structural material, and a third layer formed of expanded polystyrene foam and interposed between said first and second layers wherein the expanded polystyrene has a density in a range from about greater than 3 to 6 pounds per cubic feet.

27. A structural panel comprising first and second layers comprising a structural material, and a third layer formed of low density expanded polystyrene foam and interposed between said first and second layers wherein said first layer comprises a first coating of a structural material applied to a first side of said third layer and said second layer comprises a second coating of a structural material applied to a second side of said third layer.

28. The cabinet of claim 27 wherein said first and second coatings of structural material comprise a urethane material.

29. A cabinet for a PTV comprising a molded enclosure having upper and lower portions, said upper portion adapted to house a mirror and said lower portion adapted to house an optical unit, said enclosure being formed from a structural foam layer coated on opposing sides with a cosmetic material.

30. The cabinet of claim 29 wherein the foam is expanded polystyrene.

31. The cabinet of claim 29 wherein the foam is phenolic.

32. The cabinet of claim 29 wherein the foam has a density of about 3 to 6 pounds per cubic feet.

33. The cabinet of claim 29, wherein the cosmetic material is a plastic.

34. The cabinet of claim 29, wherein the cosmetic material is urethane.

* * * * *